Feb. 11, 1969  B. R. E. SANDBERG  3,426,631
CUTTING MACHINE INCLUDING PRODUCT MOVING MEANS
Filed Aug. 15, 1966

INVENTOR
Bert Ragnar Evert Sandberg
BY Wenderoth, Lind & Ponack
ATTORNEYS

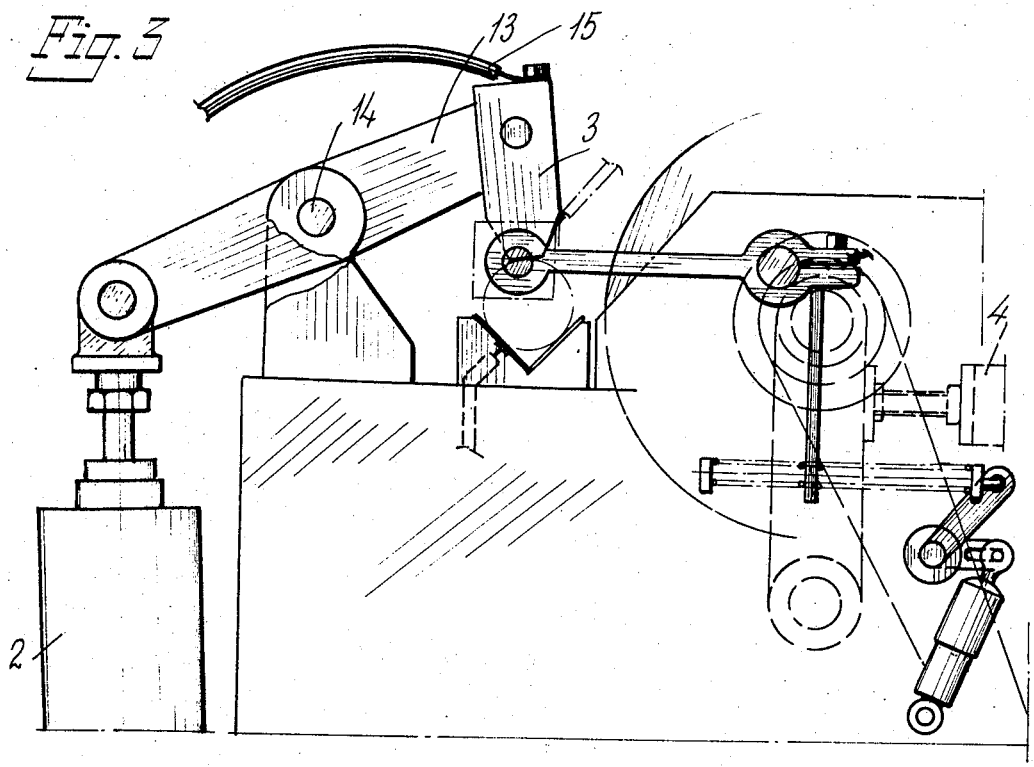
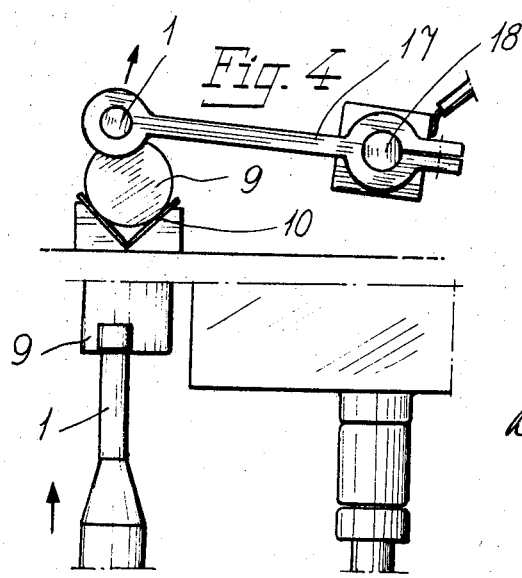
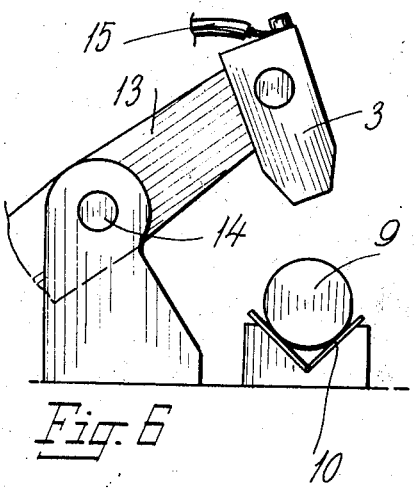
Fig. 3
Fig. 4
Fig. 5
Fig. 6
Bert Ragnar Evert Sandberg,
INVENTOR
BY Wenderoth, Lind & Ponack,
ATTORNEYS

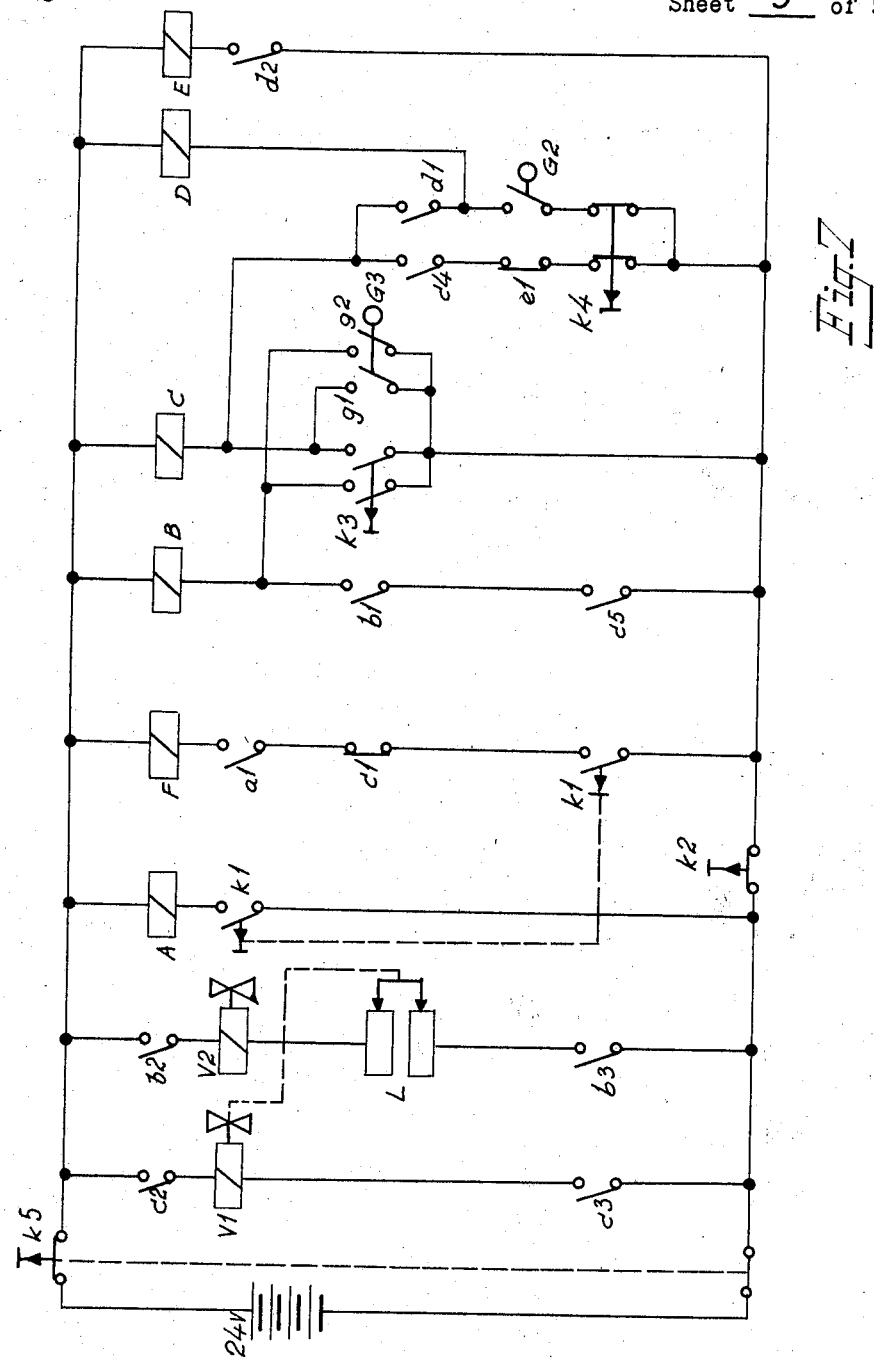

United States Patent Office 3,426,631
Patented Feb. 11, 1969

3,426,631
CUTTING MACHINE INCLUDING
PRODUCT MOVING MEANS
Bert Ragnar Evert Sandberg, Mustagatan 17,
Varnamo, Sweden
Filed Aug. 15, 1966, Ser. No. 572,253
Claims priority, application Sweden, Aug. 24, 1965,
11,054/65
U.S. Cl. 83—82    12 Claims
Int. Cl. B26d 7/06, 5/28

ABSTRACT OF THE DISCLOSURE

A machine for cutting rod and pipe material has means for clamping the material, means for advancing the material before cutting against an adjustable stop and operating means for the cutting means. An electrical circuit actuates the above means in sequence and passes through the clamping means and the material so that the circuit is broken by the cutting means when a cutting action has been completed. The cutting means are thereby automatically retracted from the material, the clamping is released and a new feed movement takes place.

---

The present invention relates to a machine for automatically cutting rod and pipe material into pieces of required lengths.

Previous cutting machines are such in which cutting is initiated by an operator who also feeds the rod or pipe blank from which the respective pieces of rod or pipe are to be cut.

A known machine of this type includes clamping members for retaining the work piece and a cutting disc fed in towards the working piece by means of a pneumatic piston-cylinder arrangement and then moved away from said work piece when cutting has been effected. The clamping members ars also operated pneumatically. Securing of the work piece and similarly advancing of the cutting disc and its withdrawal from the work piece, as well as the release of the work piece from the clamping members is carried out by the operator, who actuates some form of operating means, e.g. by depressing a foot pedal or lever which is held depressed until the disc has cut through the material and then releasing the pedal, or causing the actuating means to be inoperative, after the work piece has been cut.

The described machine admittedly function satisfactorily but it is desired to make the same fully automatic, i.e. such that firstly, the material is advanced automatically subsequent to a completed cutting action and secondly that the cutting disc is returned automatically as soon as each cutting action has been completed, without it being necessary for the operator to observe, for instance by listening, that the material has been cut. In this connection the operator will only carry out one single operation, e.g. to actuate a button to start the machine, whereafter said machine will function automatically until the work piece has been cut or the machine has stopped, automatically, after cutting the required, set number of pieces.

An automatic cutting machine according to the invention, which includes means for retaining the material and means for operating said first means and further means for cutting the material and means for operating these means, including for the purpose of acheiveing the stated result, an advancing arrangement for automatically advancing the material after each cutting operation, electrical means which subsequent to each advancement of material, actuates operating means for the retaining means, adapted to retain the material and which, when the material is held securely, also actuate operating means for the cutting means for cutting the material, and return the cutting means and securing means, to rest position in rotation, by an electric circuit, which passes through the material and the retaining means, being broken when the cutting means have effected a cut, said electrical means also actuating the advancing arrangement for causing the next piece of rod to be cut to be advanced one step.

The cutting machine according to the invention will be now described more closely with reference to an embodiment shown on the accompanying drawings.

FIG. 3 shows a section through the machine from the right in FIG. 2.

FIG. 4 shows an end stop for the work piece.

FIG. 5 shows the end stop seen from the top.

FIG. 6 shows a locking or retaining member for the work piece.

FIG. 7 shows the wiring chart for the electrical components included in the cutting machine.

Figure 1:
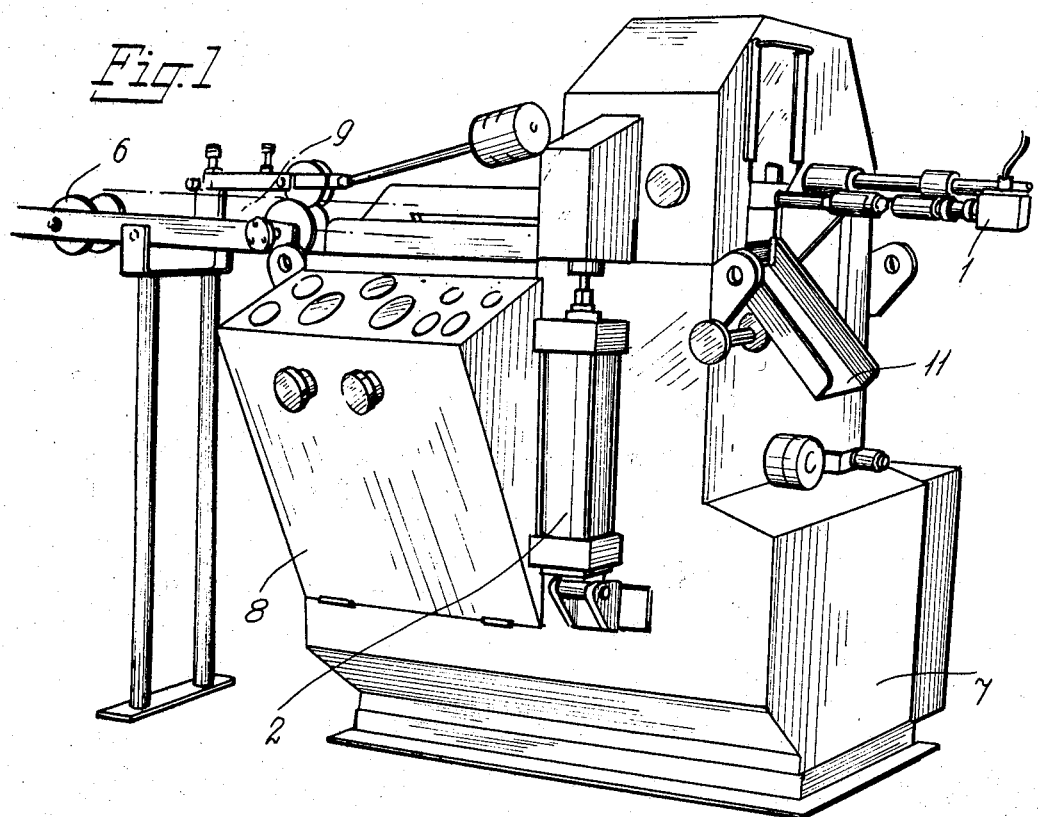
FIG. 1 is a complete view of a cutting machine seen from the front.

As can be seen from FIG. 1 the cutting machine according to the invention includes a base 7 which supports an operating panel 8 provided with various instruments and operating means, which are not described in detail. Rod material 9 resting on a V-shaped guide 10 (FIG. 2), is advanced on a roller bed 6, towards a stop abutment 1, adjusted to the correct position for the required length of the piece of rod to be cut from the rod material by displacing said stop abutment along a (not shown) graduated measuring strip. The cut pieces of rod fall out from the machine onto a discharge chute 11.

Figure 2:
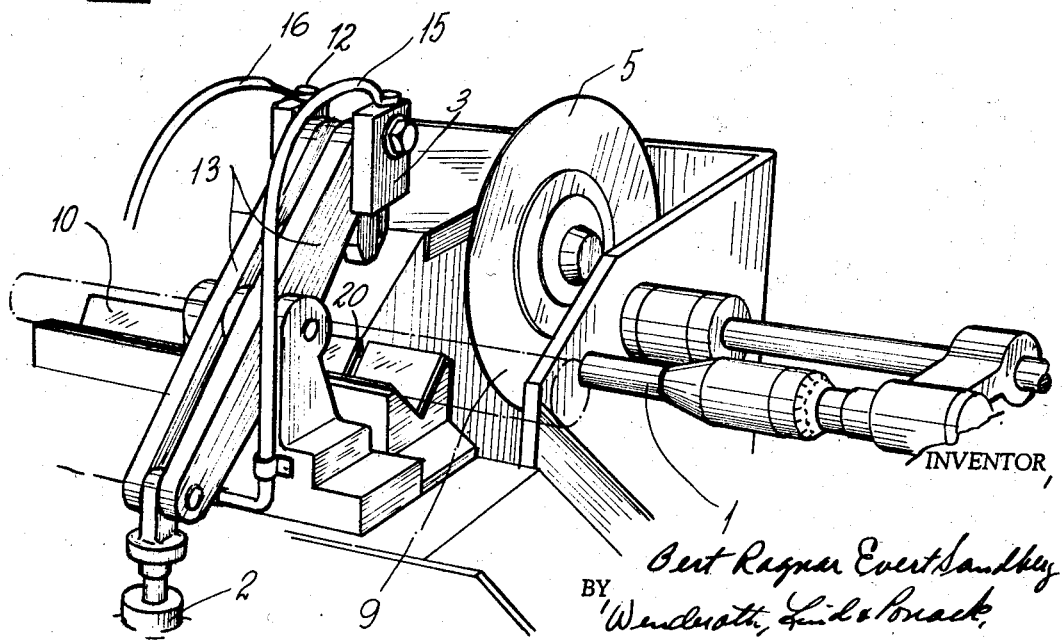
FIG. 2 shows in detail the portions of the machine intended for locking or retaining and cutting the work piece.

As can be seen from FIG. 2 the stop 1 abuts the end of the rod blank 9. The clamping of locking members 3 and 12 are disposed on one end of, and electrically insulated from, a double-armed lever 13 to the other end of which is connected a pneumatic operating cylinder 2. The lever 13 is pivotally connected with a pin 14 at a position along its length. Cables 15 and 16 are electrically connected with the members 3 and 12 respectively for supplying a weak voltage (24 volt) to the said members, the portion of the rod material present between said clamping members constituting an electrical connection between said clamping members 3 and 12. The guide 10 is electrically insulated from the machine in general.

A grinding or cutting disc 5, made of electrically insulated material, is adapted to be fed in a direction towards and away from the rod material 9 (FIG. 2) by means of a pneumatic piston-cylinder arrangement 4. The disc 5 is advanced towards the rod 9 at a position between the clamping members 3 and 12, and the guide pin 10 is broen at this position by a gap 20 permitting the entry of the disc.

As illustrated in FIG. 4 the stop abutment 1 is mounted on an arm 17 which is pivotable on the pin 18. Said arm 17 is mechanically connected to the movement of other components in the machine in such a manner that the arm is swung upwards when the clamping members 3 and 12 clamp the rod material against the guide 10, and consequently the stop abutment is moved out of abutment with the end of the rod. In doing so the end (designed as a pin) of the abutment 1 is moved automatically, by thrust spring means not shown, in a direction outwards, according to FIG. 4, so that in the upper position according to FIG. 4 it rests on the upper portion of the end of the rod 9 with a force acting in a downward direction, according to FIGS. 4 and 5.

The function of the machine will now be described with respect to its mechanical members.

When the rod 9 abuts the stop 1 air is supplied to the locking cylinder 2 so that the clamping members 3 and 12 are moved against the material to be cut. When the locking members come into contact with the rod 9 a circuit is completed via said members and the rod material. The clamping members 3 and 12, as well as the guide 10, as already mentioned, are insulated from the machine in general and a current is supplied from a 24 volt source over the lines 15 and 16 to the clamping members. Compressed air is delivered by the function of this circuit to the piston-cylinder arrangement 4 which advances the cutting disc 5 towards the rod, which is cut between the clamping members 3 and 12. When the cutting action has been completed the current is broken by the material between the clamping members, causing the cutting disc to return and the locking members 3 and 12 to be released. The roller 6 then starts again and the rod once more comes to abut the stop 1 which passes down to its lower position and presses down the previously cut piece of rod so that it falls down onto the chute 11. The locking members 3 and 12 once more receive an impulse causing them to lock or clamp the rod, and the roller stops, whereafter the described cycle is repeated for cutting a new piece of the same length from the rod 9.

The stop abutment 1 is so designed that when the material 9 depresses a limit switch arranged in the stop abutment, the locking members 3 and 12 clamp the material, whereafter the abutment 1 swings upwards as the pin arranged in said abutment moves forward approximately 5 mm., breaking the switch. When the cutting disc returns the pin in the stop abutment 1 rests against on the top of the cut piece of rod and when the locking members are released said pin forces the cut piece of rod downwards so that the stop abutment can thus return to its starting position, the cut piece of rod falling down onto the chute. This detail is directed in particular to the cutting of short lengths.

The function of the machine with respect to the electrical diagram in FIG. 7 will now be more closely described.

The main motor of the machine (not shown) is started by pressing button $k1$. The motor is suitably of a type known per se with three-phase connections. More specifically, the current is connected to the start relay A of the motor, which relay in turn connects the engine to the mains.

The contact $a1$ of the relay A provides for the connection, at a certain time delay over the start relay F, of a motor for advancing the work piece. The work piece is advanced until it abuts the stop 1. This actuates a limit switch G3 which is closed and which supplies current via the contact $g1$ to the control C which is then energized. The contact $c1$ is thus broken and the circuit for the relay F is broken, and consequently the advancing motor stops. The relay C itself holds over its contact C4 and the contact $e1$.

The relay C on being operated over the contacts $c2$ and $c3$, energized the pneumatic valve V1, whereby compresed air is supplied to the locking cylinder 2 which moves the clamping members 3 and 12 against the work piece for the purpose of retaining the same.

When closing the limit switch G3 an advancing circuit is completed for the relay B over the contact $g2$. The relay B itself holds over the contact $b1$ and the contact $c5$. Further, this relay closes its contacts $b2$ and $b3$.

When the clamping members L (FIG. 7) contact the work piece the operating current for the pneumatic valve V2 is closed over said clamping members and work piece, whereby the cylinder 4 advances the cutting disc 5 for the purpose of cutting the work piece.

The end stop 1 has meanwhile moved upwards and the pin in the same has moved outwards so that the limit switch G3 is rebroken.

The contacts $g1$ and $g2$ are broken but the relays B and C are held over the contacts $b1$, $c5$ and $c4$, $e1$ respectively.

The valve V2 causes further closing of the limit switch G2 which closes the current to the relay D which when actuated closes the current to the relay E over the contact $d2$. Contact $e1$ is broken but the relay C is held over G2 and the contact $d1$.

When the rod has been cut the current is broken by the material of the cutting disc and consequently the valve V2 falls and the cutting disc returns to its starting position owing to the counter pressure active in its pneumatic cylinder. The limit switch G2 is thus broken resulting in the relay D falling. The relays C (at $d1$) and B (at $c5$) also fall. The valve V1 returns to starting position ($c2$, $c3$) in addition to which the relay (E) falls.

On disconnection of relay C, its contact $c1$ closes the current to relay F so that the feed motor for the conveying arrangement is restarted, after which the described cycle is repeated for cutting the next piece of rod.

In FIG. 7 the designation $k1$ indicates the starting button for the machine, $k2$ the disengagement button, $k3$ a button for manually connecting the valves (takes over the action of G3), $k4$ the button for disengaging the valves (takes over the action of G2) and $k5$ an emergency stop button which breaks the supply lines from the cell (24 volt).

The invention has been described in conjunction with a specific embodiment but naturally a variety of modifications are possible within the scope of the inventive idea and following claims.

I claim:

1. A machine for cutting rod and pipe material into pieces of required lengths, said machine including means for retaining the material, means for cutting the material and operating means for the retaining means and for the cutting means, wherein said machine is provided with advancing means for automatically advancing the material after each cutting operation, electrical means which, subsequent to each advancement of the material, actuate operating means for the retaining means for retaining the material and, when the material is clamped securely, actuate the operating means for the cutting means for cutting the material, said electrical means also returning the cutting means and securing means, in sequence, under the influence of a circuit passing through the material and said securing means, which circuit is broken by the cutting means when a cutting action has been completed, as well as starting the advancing means for advancing the material one step for cutting the next piece of rod from the rod blank.

2. A machine as claimed in claim 1, characterised in that the advancing arrangement is constituted of a roller bed.

3. A machine as claimed in claim 1, characterised in that the retaining means are constituted of two similar clamping members mutually spaced, for holding the material against a guide.

4. A machine as claimed in claim 3 wherein said guide is electrically insulated.

5. A machine as claimed in claim 1 wherein said operating means are constituted by pneumatic piston-cylinder means having operating valves.

6. A machine as claimed in claim 5 wherein said operating valve for the cutting means is arranged to release the working pressure of corresponding piston-cylinder means and cause back pressure to work in said cylinder when the circuit through said retaining means and the material has been broken.

7. A machine as claimed in claim 1 wherein an adjustable stop abutment is provided for regulating the length of the cut piece, said abutment being adapted to prevent movement of said advancing means when the material has come into operating contact with said stop abutment.

8. A machine as claimed in claim 7 wherein the portion of said stop abutment contacting the end of the rod material is a resiliently adapted pin, which is pressed inwardly under the influence of the axial pressure of the rod material fed towards it so that said pin when said stop abutment is moved upwards and out of contact with the rod material will move outwardly and come to rest against the upper free end of the rod when the rod has been cut and the abutment as a whole is moved downwardly, as a result of which the pin will force the cut piece out of the path of the remaining portion of the rod.

9. A machine as claimed in claim 7 wherein said abutment is provided with an electric limit position switch arranged to connect an operating valve for said retaining means when said switch is actuated by the end of the advanced material.

10. A machine as claimed in claim 1 wherein said retaining means are secured, by means of intermediate electric insulating means to one end of a two-armed lever, the opposite end of which is actuated by a pneumatic operating piston-cylinder means.

11. A machine as claimed in claim 1 wherein said retaining means comprises two elements each connected to a pole of an electric current source.

12. A machine as claimed in claim 1 wherein said operating means for the cutting means is adapted to actuate in its inactive position a limit position switch for returning active members of the machine to their starting position after a cutting operation has been effected.

References Cited

UNITED STATES PATENTS

| | | | |
|---|---|---|---|
| 2,144,335 | 1/1939 | Jensen et al. | 83—210 |
| 2,589,576 | 3/1952 | Rose | 83—210 |
| 2,781,573 | 2/1957 | Espari et al. | 83—282 X |

DONALD R. SCHRAN, *Primary Examiner.*

F. T. YOST, *Assistant Examiner.*

U.S. Cl. X.R.

83—209, 212, 282